United States Patent [19]

Kojima et al.

[11] Patent Number: 5,338,780
[45] Date of Patent: Aug. 16, 1994

[54] POLYOLEFIN RESIN COMPOSITION CONTAINING CARBON BLACK

[75] Inventors: Fumitoshi Kojima, Ibaraki; Tetsuo Yamaguchi, Toyonaka, both of Japan

[73] Assignee: Sumitomo Chemical Company, Limited, Osaka, Japan

[21] Appl. No.: 156,903

[22] Filed: Nov. 24, 1993

[30] Foreign Application Priority Data

Dec. 9, 1992 [JP] Japan .................. 4-329214

[51] Int. Cl.$^5$ .................... C08K 5/34; C08K 5/35
[52] U.S. Cl. .................... 523/453; 524/99; 524/100; 524/102; 524/103; 524/108; 524/110; 524/237; 524/282; 523/468
[58] Field of Search .......... 524/99, 100, 102, 103, 524/108, 110, 282, 368, 376, 237; 523/453, 468

[56] References Cited

U.S. PATENT DOCUMENTS

| | | |
|---|---|---|
| 4,576,734 | 3/1986 | Ishii et al. . |
| 4,839,408 | 6/1989 | Fukui et al. .................. 524/100 |
| 4,985,480 | 1/1991 | Fukui et al. . |
| 5,214,084 | 5/1993 | Ishii et al. .................. 524/100 |

FOREIGN PATENT DOCUMENTS

| | | |
|---|---|---|
| 0222566 | 5/1987 | European Pat. Off. . |
| 0341925 | 11/1989 | European Pat. Off. . |
| 60-42441 | 3/1985 | Japan . |
| 3-207733 | 9/1991 | Japan . |

OTHER PUBLICATIONS

E. Stengrevices et al., Stabilization of Filled Polyolefins, Jul./Aug., 1987, pp. 35, 38 and 39.

*Primary Examiner*—Joseph L. Schofer
*Assistant Examiner*—Jeffrey T. Smith
*Attorney, Agent, or Firm*—Wenderoth, Lind & Ponack

[57] ABSTRACT

A polyolefin resin (A) containing carbon black is blended with the following components:

(B) a phenolic compound represented by the following formula (I):

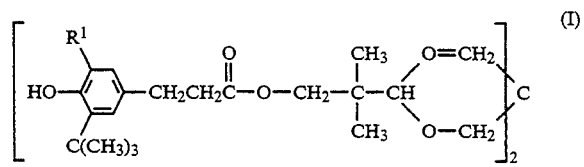

wherein $R^1$ is alkyl of 1 to 4 carbon atoms;

(C) an organic sulfur compound selected from the compounds represented by the following formulas (II-1) and (II-2):

$$(R^2-OCOCH_2CH_2)_2S \qquad \text{(II-1)}$$

$$(R^2-SCH_2CHCOOCH_2)_4C \qquad \text{(II-2)}$$

wherein $R^2$ is alkyl of 4 to 20 carbon atoms;

(D) a piperidine compound having at least one 2,2,6,6-tetramethylpiperidine ring in a molecule; and (E) an epoxy compound of bisphenol A type glycidyl ether. The composition thus blended exhibits excellent stability against thermal oxidation.

10 Claims, No Drawings

POLYOLEFIN RESIN COMPOSITION CONTAINING CARBON BLACK

The present invention relates to a polyolefin resin composition containing carbon black, and more specifically, it relates to a polyolefin resin composition containing carbon black which exhibits excellent stability against thermal oxidation.

Polyolefin resins, including polyethylene and polypropylene, have excellent physical, chemical and electrical properties and therefore are found in wide use, and carbon black is often incorporated therein for improving their stability against light or for coloring. Also, other inorganic fillers are sometimes incorporated therein to improve their mechanical properties. On the other hand, polyolefin resins are highly susceptible to thermal oxidative deterioration, and therefore in the past methods phenolic antioxidants and sulfur antioxidants have been used in combination for their antioxidation. Nevertheless, particularly polyolefin resin compositions containing carbon black have a disadvantage of considerably lower stability against thermal oxidation, and thus their improvement has been desired.

In order to improve the stability of polyolefin resins containing carbon black against thermal oxidation, some proposals have been made, including a method in which a metal deactivator is incorporated therein (Japanese Patent Kokai No. 207733/91), a method in which a piperidine compound is incorporated therein (Japanese Patent Kokai No. 42441/85 and Plastics Compounding, 1987, Jul/Aug, pp. 35, 38, 39), etc. Furthermore, a method has been proposed wherein an amide compound is added to polyolefin resins which contain an inorganic filler such as talc, to improve their stability against thermal oxidation (U.S. Pat. No. 4,985,480).

Nevertheless, in these known methods, and particularly in those using carbon black, it has not always been possible to obtain sufficient stability against thermal oxidation. The present inventors have accomplished the present invention as a result of much research intended to provide a solution to this problem and to develop a polyolefin resin composition which exhibits excellent stability against thermal oxidation while containing carbon black.

Thus, the present invention provides a polyolefin resin composition which comprises a polyolefin resin containing carbon black (A) and the following components (B) to (E):

(B) a phenolic compound represented by the following formula (I):

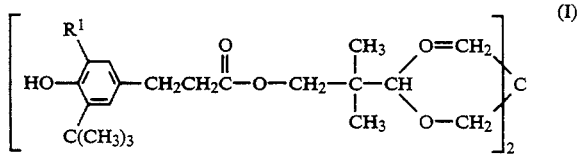

wherein $R^1$ is alkyl of 1-4 carbon atoms;
(C) an organic sulfur compound selected from the compounds represented by the following formulas (II-1) and (II-2):

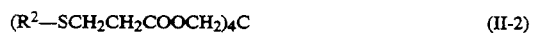

wherein $R^2$ is alkyl of 4–20 carbon atoms;
(D) a piperidine compound having at least one 2,2,6,6-tetramethylpiperidine ring in a molecule; and
(E) an epoxy compound of bisphenol A type glycidyl ether.

The polyolefin resins to be used in the present invention include homopolymers of an α-olefin such as ethylene, propylene, 1-butene, isobutene, 1-hexene, 3-methyl-1-butene, 4-methyl-1-pentene or 1-decene; random or block copolymers consisting of 2 or more α-olefins; copolymers of an α-olefin and other one or more unsaturated compounds copolymerizable therewith; and the like. These may be used each alone or by blending 2 or more thereof together.

Examples of the α-olefin homopolymers are polyethylene, polypropylene, poly-1-butene, polyisobutene, poly-3-methyl-1-butene, poly-4-methyl-1-pentene, and the like. Examples of the copolymers of α-olefins are ethylene/propylene copolymer, ethylene/1-butene copolymer, propylene/4-methyl-1-pentene copolymer, propylene/1-butene copolymer, 1-decene/4-methyl-1-pentene copolymer, ethylene/propylene/1-butene copolymer, and the like. Also included are copolymers which comprise, in addition to an α-olefin, a polyunsaturated compound such as a conjugated diene or an unconjugated diene, or a monounsaturated compound such as acrylic acid, methacrylic acid or vinyl acetate, as a copolymerizable ingredient. These polymers may be modified by an acid, for example, they may be graft-modified with an α, β-unsaturated fatty acid, an alicyclic carboxylic acid, or a derivative thereof.

Furthermore, according to the present invention there may be used blends comprising a mixture of a synthetic rubber with any of these polyolefin resins, depending on the use. Examples of the synthetic rubber suitable for blending include ethylene/α-olefin copolymer rubber, and the like. The ethylene/α-olefin copolymer rubber includes copolymer rubber of ethylene and any other α-olefin such as propylene, 1-butene or 1-hexene, as well as ternary copolymer rubber resulting from copolymerization of an unconjugated diene such as ethylidene norbornene or dicyclopentadiene as a third component with an ethylene/propylene system.

Carbon black is incorporated in such polyolefin resins which may contain an optional synthetic rubber blended therewith. The carbon black used here may be obtained by any method of production, and specific examples thereof are channel black, furnace black, acetylene black, and the like. The average particle diameter thereof is preferably 30μ or less, from the viewpoint of dispersibility in the resin.

The proportion of carbon black incorporated in the resin is not particularly limited, but generally, on the basis of the total weight of the polyolefin resin containing carbon black (including the weight of the synthetic rubber, if blended therewith), the carbon black is preferably contained therein in an amount of 0.05–10 w/w %. If the amount of carbon black is less than 0.05 w/w %, then the desired effect may not be adequately achieved, and if it is over 10 w/w %, then there may tend to be a loss in the mechanical strength.

Furthermore, according to the present invention an inorganic filler may be incorporated therein together with carbon black. Specific examples of the inorganic filler which may be used are talc, mica, titanium oxide, zinc oxide, aluminum hydroxide, calcium carbonate, magnesium carbonate, calcium sulfate, barium sulfate, magnesium silicate, cerite, kaolin, zeolite, silica, asbestos, glass fiber, carbon fiber, barium titanate, lead titanate, and the like. They may be used each alone or by combining 2 or more thereof together. To improve the low temperature impact resistance, moldability and coating properties, it is preferable to use, for example, talc, mica or glass fiber.

When using such inorganic fillers in addition to carbon black, the inorganic filler other than carbon black is preferably used at a proportion of 50 w/w % or less with respect to the combined weight of the polyolefin resin (including the weight of the synthetic rubber, if blended therewith), the carbon black and the other inorganic filler. More preferably, the inorganic filler is used at a proportion in the range of 35 w/w % or less. Also, for these inorganic fillers to sufficiently exhibit their effect they are preferably incorporated therein in an amount of 1 w/w % or more.

According to the present invention, as explained above, to the polyolefin resin (A) which contains carbon black, which may also contain another optional inorganic filler, and which may also have an optional synthetic rubber blended therewith, is added a particular phenolic compound (B), a Particular organic sulfur compound (C), a piperidine compound (D) and an epoxy compound (E), which have been mentioned earlier. In the present specification, unless otherwise mentioned, references to the polyolefin resin containing carbon black (A) and simply component (A) should be interpreted to include those containing optional components such as an inorganic filler other than carbon black and/or a synthetic rubber when they are incorporated therein.

Component (B) according to the present invention, the phenolic compound, is represented by the formula (I). In the formula, $R^1$ is alkyl of 1–4 carbon atoms, and of these, alkyl of 1–3 carbon atoms such as methyl, ethyl, propyl or isopropyl, especially methyl, is preferred. The phenolic compound (B) may be any one alone in which $R^1$ in formula (I) is alkyl of 1–4 carbon atoms, or it may be a combination of 2 or more different ones in which the $R^1$ groups differ.

Component (C), the organic sulfur compound, is represented by the formula (II-1) or (II-2). In the formulas (II-1) and (II-2), $R^2$ is alkyl of 4–20 carbon atoms, and the preferred number of carbon atoms of the alkyl is from 6 to 18. These sulfur compounds may also be used each alone or with 2 or more thereof in combination. As specific examples of the sulfur compound (C) to be used according to the present invention, the following compounds may be mentioned.

Dilauryl 3,3'-thiodipropionate
Dimyristyl 3,3'-thiodipropionate
Distearyl 3,3'-thiodipropionate
Tetrakis(3-laurylthiopropionyloxymethyl)methane Component (D), the piperidine compound, has at least one 2,2,6,6-tetramethylpiperidine ring in a molecule, and any commonly known type of hindered piperidine light stabilizer may be used. Particularly preferred for use as the piperidine compound (D) according to the present invention include, for example, the following compounds (D1) to (D7).

(D1) A compound represented by the following formula (III):

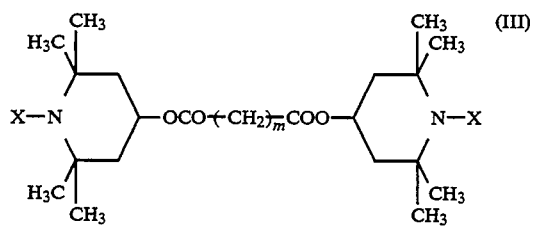

wherein X is hydrogen, oxygen, alkyl of 1–4 carbon atoms, hydroxy or alkoxy of 1–18 carbon atoms, and m is an integer of 1–8. Examples of the compounds included in (D1) are bis(2,2,6,6-tetramethyl-4-piperidyl) sebacate, bis(1,2,2,6,6-pentamethyl-4-piperidyl) sebacate, and the like.

(D2) A compound represented by the following formula (IV):

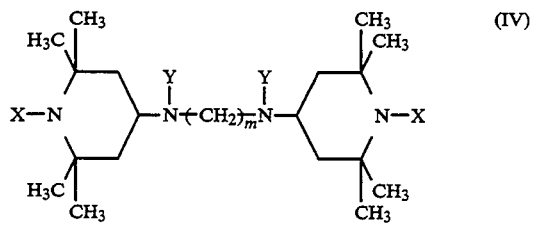

wherein X is hydrogen, oxygen, alkyl of 1–4 carbon atoms, hydroxy or alkoxy of 1–18 carbon atoms, m is an integer of 1–8, and Y is hydrogen, alkyl of 1–4 carbon atoms, alkanoyl of 2–4 total carbon atoms or $-CH_2CH_2OCOCH_3$ (2-acetoxyethyl). An example of the compounds included in (D2) is N,N'-bis(2,2,6,6-tetramethyl-4-piperidyl)-hexamethylenediamine.

(D3) A compound represented by the following formula (V):

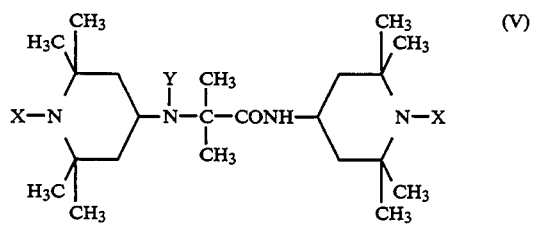

wherein X is hydrogen, oxygen, alkyl of 1–4 carbon atoms, hydroxy or alkoxy of 1–18 carbon atoms, and Y is hydrogen, alkyl of 1–4 carbon atoms, alkanoyl of 2–4 total carbon atoms or 2-acetoxyethyl. An example of the compounds included in (D3) is 2-methyl-2-(2,2,6,6-tetramethyl-4-piperidyl)amino-N-(2,2,6,6-tetramethyl-4-piperidyl)propionamide.

(D4) A compound represented by the following formula (VI):

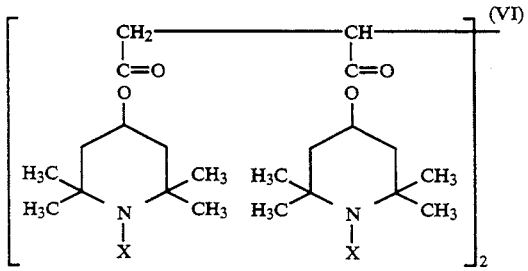

wherein X is hydrogen, oxygen, alkyl of 1–4 carbon atoms, hydroxy or alkoxy of 1–18 carbon atoms. An example of the compounds included in (D4) is tetrakis(2,2,6,6-tetramethyl-4-piperidyl) 1,2,3,4-butanetetracarboxylate.

(D5) An oligomeric compound having a repeating unit represented by the following formula (VII):

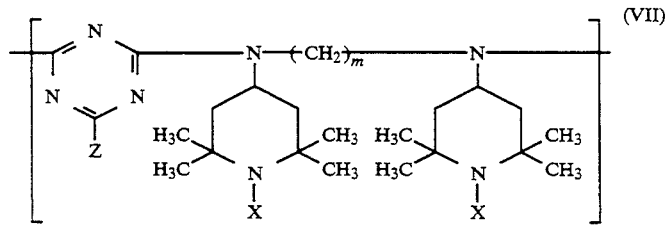

wherein X is hydrogen, oxygen, alkyl of 1–4 carbon atoms, hydroxy or alkoxy of 1–18 carbon atoms, m is an integer of 1–8, and Z is chlorine, $NR^3R^4$ or morpholino, in which $R^3$ is hydrogen or alkyl of 1–4 carbon atoms and $R^4$ is alkyl of 1–18 carbon atoms. Generally, the number of repeating units in the above formula (VII) is about 2–20.

Examples of the compounds included in (D5) are poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], poly[(6-morpholino-1,3,5-triazin-2,4-diyl){(2,2,6,6-tetramethyl-4-piperidyl)imino}hexamethylene{(2,2,6,6-tetramethyl-4-piperidyl)imino}], and the like.

(D6) A polycondensation product of a dicarboxylic compound represented by the following formula (VIII):

wherein $R^3$ is hydrogen or alkyl of 1–4 carbon atoms and m is an integer of 1–8, with a dihydroxy compound represented by the following formula (IX):

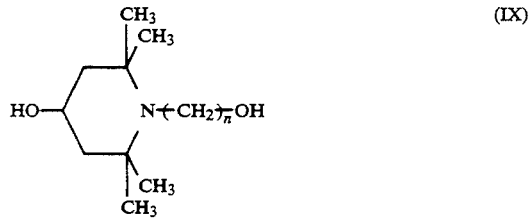

wherein n is an integer of 1–8. An example of the compounds included in (D6) is a polycondensation product of dimethyl succinate and 1-(2-hydroxyethyl)-4-hydroxy-2,2,6,6-tetramethylpiperidine.

(D7) A condensation product of an aliphatic polyamine with a chlorotriazine compound represented by the following formula (X):

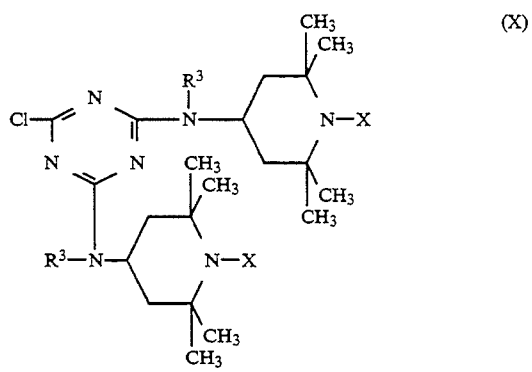

wherein X is hydrogen, oxygen, alkyl of 1–4 carbon atoms, hydroxy or alkoxy of 1–18 carbon atoms, and $R^3$ is hydrogen or alkyl of 1–4 carbon atoms. Here, the "aliphatic polyamine" refers to aliphatic compounds which have at least two primary or secondary amino groups in a molecule, and which may even have a tertiary amino group, and particularly these amino groups are preferably bonded via an alkylene, especially an alkylene of about 2–11 carbon atoms. Examples of the aliphatic polyamine are 4,7-diazadecane-1,10-diamine, tris(2-aminoethyl)amine, 1,6,11-triaminoundecane, and the like.

An example of the compounds included in (D7) is N,N',4,7-tetrakis[4,6-bis{N-butyl-N-(1,2,2,6,6-pentamethyl-4-piperidyl)amino}-1,3,5-triazin-2-yl]-4,7-diazadecane-1,10-diamine.

The piperidine compound (D) described above may also be used each alone or with 2 or more thereof in combination.

The stability of the polyolefin resin against thermal oxidation is improved by incorporating the components (B), (C) and (D) described above to a polyolefin resin containing carbon black (A), but according to the present invention an epoxy compound of bisphenol A type glycidyl ether is also incorporated therein as component (E), for an even greater effect. In systems which use an inorganic filler other than carbon black, particularly talc or the like, there is a tendency towards loss of the antioxidation property thereof, but by adding thereto an epoxy compound of bisphenol A type glycidyl ether, the reduction of the antioxidation property may be prevented.

The epoxy compound of bisphenol A glycidyl ether referred to here is a compound which is usually produced by a condensation reaction of bisphenol A with epichlorohydrin, and which is an oligomeric compound having a residual end epoxy group, and has a structure of the following formula (XI):

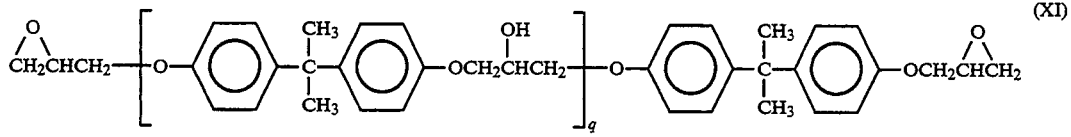

wherein q is a number of 0 or more. The epoxy compounds are available as those having an epoxy equivalent of about 170–5000, or if expressed with the value of q in the formula (XI), those having q of 0 or more and up to an average value of about 35. They are solid or liquid at ordinary temperature, and either of them may be used in the present invention.

The amounts of each of the components (B) to (E) are not particularly limited, but their respective preferred amounts for use are, based on 100 parts by weight of the polyolefin resin containing carbon black (A), 0.01–1 part by weight of the phenolic compound (B), 0.02–2 parts by weight of the organic sulfur compound (C), 0.01–1 part by weight of the piperidine compound (D) and 5 parts by weight or less of the epoxy compound (E). The amounts of the phenolic compound (B) less than 0.01 part by weight, the organic sulfur compound (C) less than 0.02 part by weight and the piperidine compound (D) less than 0.01 part by weight per 100 parts by weight of the polyolefin resin containing carbon black (A) will sometimes cause to achieve the desired effect inadequately, whereas their amounts exceeding 1 part by weight, 2 parts by weight and 1 part by weight, respectively, will not produce much improvement enough for the excess amounts, and thus it is uneconomical. In order to effectively exhibit the effect of incorporating the epoxy compound (E), it is preferably used in an amount of 0.01 part by weight or more per 100 parts by weight of the polyolefin resin containing carbon black (A).

The polyolefin resin composition containing carbon black according to the present invention may contain other additives in addition to the components described above, for example, processing stabilizers, antioxidants, light stabilizers, metal deactivators, metal soaps, nucleating agents, antistatic agents, lubricants, flame retardants, releasing agents, mildew resistant agents, etc., so long as they do not hinder the properties of the composition.

Examples of the processing stabilizers which may be used include the following:
2-t-butyl-6-(3-t-butyl-2-hydroxy-5-methylbenzyl)-4-methylphenyl acrylate,
2-[1-(2-hydroxy-3,5-di-t-pentylphenyl)ethyl]-4,6-di-t-pentylphenyl acrylate, and the like.

The antioxidants can be phenolic antioxidants other than component (B), sulfur antioxidants other than component (C), phosphoric antioxidants, and the like. Examples of the phosphoric antioxidants include the following:
tris(nonylphenyl) phosphite,
tris(2,4-di-t-butylphenyl) phosphite,
bis(2,4-di-t-butylphenyl) pentaerythritol diphosphite,
bis(2,6-di-t-butyl-4-methylphenyl) pentaerythritol diphosphite,
distrearyl pentaerythritol diphosphite,
tetrakis(2,4-di-t-butylphenyl) 4,4′-biphenylenediphosphonite,
2,2′-ethylidenebis(4,6-di-t-butylphenyl) fluorophosphite,
2,2′-methylenebis(4,6-di-t-butylphenyl) octyl phosphite, and the like.

The light stabilizers can be, for example, ultraviolet absorbers such as benzotriazoles, benzophenones, hydroxybenzoates and cyanoacrylates, and nickel quenchers.

Examples of the ultraviolet absorbers include the following:
2-(3-t-butyl-2-hydroxy-5-methylphenyl)-5-chlorobenzotriazole,
2-(3,5-di-t-butyl-2-hydroxyphenyl)benzotriazole,
2-(2-hydroxy-5-methylphenyl)benzotriazole,
2-(2-hydroxy-5-t-octylphenyl)benzotriazole,
2-(3,5-di-t-pentyl-2-hydroxyphenyl)benzotriazole,
2-[2-hydroxy-3-(3,4,5,6-tetrahydrophthalimidomethyl)-5-methylphenyl]benzotriazole,
2-[2-hydroxy-3,5-bis($\alpha,\alpha$-dimethylbenzyl)phenyl]benzotriazole,
2-hydroxy-4-octyloxybenzophenone,
2-hydroxy-4-methoxybenzophenone,
2,4-di-t-butylphenyl 3,5-di-t-butyl-4-hydroxybenzoate,
ethyl 2-cyano-3,3-diphenylacrylate, and the like.

Examples of the metal deactivators include the following:
N,N′-diphenyloxamide,
N-salicylidene-N′-salicyloylhydrazine,
N,N′-bis(salicyloyl)hydrazine,
N,N′-bis[3-(3,5-di-t-butyl-4-hydroxyphenyl)propionyl]-hydrazine,
3-salicyloylamino-1,2,4-triazole, oxalic acid bis(N′-benzylidenehydrazide), and the like.

Examples of the nucleating agents include the following:
alkali metal salts and alkaline earth metal salts of an aromatic monocarboxylic acid, such as sodium or calcium salts of benzoic acid, toluic acid, or p-t-butylbenzoic acid;
dibenzylidene sorbitols such as 1,3.2,4-di(benzylidene) sorbitol, 1,3.2,4-di(p-methylbenzylidene) sorbitol and 1,3.2,4-di(p-ethylbenzylidene) sorbitol;
aromatic phosphate compounds such as sodium bis(4-t-butylphenyl) phosphate and sodium 6,6′-methylenebis(2,4-di-t-butylphenyl) phosphate; and the like.

Examples of the flame retardants include the following:
phosphoric acid esters such as tricresyl phosphate, triphenyl phosphate, diphenyl octyl phosphate and tributyl phosphate;
halogenous phosphoric acid esters such as tris(2-chloroethyl) phosphate and tris(2,3-dibromopropyl) phosphate;
halogenous vinyl compounds such as vinyl chloroacetate, bromostyrene and bromophenyl allyl ether;
halogenated compounds such as chlorinated paraffin, brominated polyphenyl, perchloropentacyclodecane, tetrabromoethane, hexabromocyclododecane, tetrachlorophthalic anhydride, tetrabromophthalic anhydride, tetrabromobisphenol A and decabromodiphenyl oxide;

metal-containing inorganic compounds such as antimony trioxide and aluminum hydroxide; and the like.

The present invention is explained in more detail with reference to the Examples provided, but the invention is not limited to these Examples. Unless otherwise specified, the terms "part" and "percent" in the Examples indicate "part by weight" and "percent by weight", respectively.

The test additives used in the Examples are as follows, and they are listed with their respective designations given below.

Phenolic compounds

B-1: 3,9-Bis[2-{3-(3-t-butyl-4-hydroxy-5-methylphenyl)propionyloxy}-1,1-dimethylethyl]-2,4,8,10-tetraoxaspiro[5.5]undecane B-2: 1,3,5-Tris(3,5-di-t-butyl-4-hydroxybenzyl) isocyanurate B-3: Tetrakis[3-(3,5-di-t-butyl-4-hydroxyphenyl)propionyloxymethyl]methane

Sulfur compounds

C-1: Tetrakis(3-laurylthiopropionyloxymethyl)methane

C-2: Distrearyl 3,3'-thiodipropionate

Piperidine compounds

D-1: Poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl4piperidyl)imino}]

D-2: Bis(2,2,6,6-tetramethyl-4-piperidyl) sebacate

D-3: N,N'-Bis(2,2,6,6-tetramethyl-4-piperidyl)-hexamethylenediamine

D-4: N,N',4,7-Tetrakis[4,6-bis{N-butyl-N-(1,2,2,6,6-pentamethyl-4-piperidyl)amino}-1,3,5-triazin-2-yl]-4,7-diazadecane-1,10-diamine D-5: Polycondensation product of dimethyl succinate and 1-(2-hydroxyethyl)-4-hydroxy-2,2,6,6-tetramethylpiperidine

REFERENCE EXAMPLE

Formulation

Unstabilized propylene/ethylene block copolymer 99 parts (ethylene content of 7.3%; product of Sumitomo Chemical Co., Ltd.)

| | |
|---|---|
| Carbon black (furnace black) (product of Sumika Color Co., Ltd.; particle size of 18 μ or less) | 1 part |
| Calcium stearate | 0.05 part |
| Test additives | Shown in Table 1 |

The amounts of each of the test additives are shown as proportions (parts) to 100 parts of the block copolymer and the carbon black combined. The above mentioned compositions were dry blended, and then kneaded in a 30 mmφ twin-screw extruder at a cylinder temperature of 220°–230° C. to prepare pellets. The pellets were molded using a 1-ounce injection molding machine at a cylinder temperature of 220°–230° C. to obtain sheets having a size of 40×60×1 mm.

From these sheets were prepared specimens having a size of 40×40×1 mm, which were placed in a Geer oven at 160° C. to determine their stability against thermal oxidation based on the time until embrittlement occurred on the specimen (embrittlement life). A longer embrittlement life signifies a more excellent stability against thermal oxidation. The results are shown in Table 1.

TABLE 1

| | Formulation | | | | | | Test results Embrittlement life (days) |
|---|---|---|---|---|---|---|---|
| | Phenolic compounds | | Sulfur compounds | | Piperidine compounds | | |
| Run No. | Type and parts | | | | | | |
| 1 | B-1 | 0.1 | C-1 | 0.1 | D-1 | 0.5 | 75 |
| 2 | | | C-1 | 0.1 | D-1 | 0.5 | 34 |
| 3 | B-1 | 0.1 | | | D-1 | 0.5 | 37 |
| 4 | B-1 | 0.1 | C-1 | 0.1 | | | 19 |
| 5 | B-1 | 0.5 | C-1 | 0.5 | | | 52 |

EXAMPLE

Formulation

| | |
|---|---|
| Unstabilized propylene/ethylene block copolymer (ethylene content of 7.3%; product of Sumitomo Chemical Co., Ltd.) | 80 parts |
| Carbon black (furnace black) (product of Sumika Color Co., Ltd.; particle size of 18 μ or less) | 0.5 part |
| Talc (product of Hayashi Kasei, K.K.) | 19.5 parts |
| Epoxy compound of bisphenol A type glycidyl ether (product of Sumitomo Chemical Co., Ltd.; epoxy equivalent of 450–500) | 0.5 part |
| Test additives | Shown in Table 2 |

The amounts of each of the test additives and the epoxy compound are shown as proportions (parts) to 100 parts of the block copolymer, the carbon black and the talc, combined. The above mentioned compositions were mixed with a Henschel mixer and then kneaded using a 30 mmφ twin-screw extruder at a cylinder temperature of 230°–240° C. to prepare pellets. The pellets were molded using a 5.5-ounce injection molding machine at a cylinder temperature of 200°–210° C. to obtain specimens having a size of 64×12.7×3.2 mm.

After being notched, these specimens were placed in a 150° C. Geer oven and subjected every 250 hours to an Izod impact test. The times until the impact strength was reduced to 50% of the initial value were determined, and the stability against thermal oxidation was judged based on these 50% impact strength retention times. The 50% impact strength retention time was calculated in a proportional manner on the basis of the measurements of the impact strength obtained by the Izod impact tests which were carried out at 250 hour intervals. A longer 50% impact strength retention time signifies a more excellent stability against thermal oxidation. The results are shown in Table 2.

TABLE 2

| Run No. | Formulation | | | | | | Test results 50% impact strength retention time (hr) |
|---|---|---|---|---|---|---|---|
| | Phenolic compounds | | Sulfur compounds | | Piperidine compounds | | |
| | Type and parts | | | | | | |
| Runs of the present invention | 1 | B-1 | 0.05 | C-2 | 0.3 | D-1 | 0.1 | 1145 |
| | 2 | B-1 | 0.1 | C-2 | 0.15 | D-1 | 0.1 | 840 |
| | 3 | B-1 | 0.1 | C-2 | 0.15 | D-2 | 0.1 | 950 |
| | 4 | B-1 | 0.1 | C-2 | 0.15 | D-3 | 0.1 | 860 |
| | 5 | B-1 | 0.1 | C-2 | 0.15 | D-4 | 0.1 | 915 |
| | 6 | B-1 | 0.1 | C-2 | 0.15 | D-5 | 0.1 | 890 |
| For comparison | 7 | B-2 | 0.1 | C-2 | 0.15 | D-1 | 0.1 | 765 |
| | 8 | B-3 | 0.1 | C-2 | 0.15 | D-1 | 0.1 | 535 |

According to the present invention, a composition prepared by incorporating particular compounds in a polyolefin resin containing carbon black exhibits excellent stability against thermal oxidation.

What is claimed is:

1. A polyolefin resin composition containing carbon black, which comprises:

(A) polyolefin resin containing carbon black;

(B) a phenolic compound represented by the following formula (I):

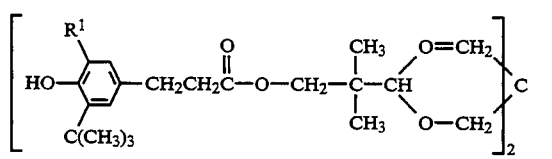

wherein $R^1$ is alkyl of 1 to 4 carbon atoms;

(C) an organic sulfur compound selected from the compounds represented by the following formulas (II-1) and (II-2):

(II-1)

(II-2)

wherein $R^2$ is alkyl of 4 to 20 carbon atoms;

(D) a piperidine compound having at least one 2,2,6,6-tetramethylpiperidine ring in a molecule; and (E) an epoxy compound of bisphenol A glycidyl ether.

2. The composition of claim 1, wherein the polyolefin resin of the component (A) further comprises a synthetic rubber.

3. The composition of claim 1, wherein the carbon black is present in an amount of 0.05 to 10% by weight based on the total weight of the component (A).

4. The composition of claim 1, wherein the polyolefin resin of the component (A) further comprises an inorganic filler other than the carbon black.

5. The composition of claim 4, wherein the inorganic filler other than the carbon black is present in an amount not higher than 50% by weight based on the total weight of the component (A).

6. The composition of claim 1, wherein the phenolic compound of the component (B) is represented by the formula (I) in which $R^1$ is methyl.

7. The composition of claim 1, wherein the organic sulfur compound of the component (C) is dilauryl 3,3'-thiodipropionate, dimyristyl 3,3'-thiodipropionate, distearyl 3,3'-thiodipropionate or tetrakis(3-laurylthiopropionyloxymethyl)methane.

8. The composition of claim 1, wherein the piperidine compound of the component (D) is selected from the following compounds (D1) to (D7):

(D1) a compound represented by the following formula (III):

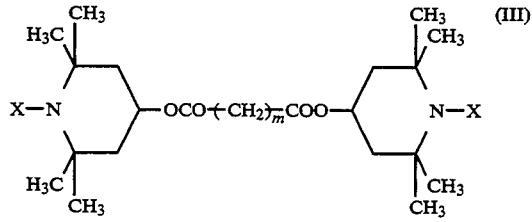

wherein X is hydrogen, oxygen, alkyl of 1 to 4 carbon atoms, hydroxy or alkoxy of 1 to 18 carbon atoms, and m is an integer of 1 to 8;

(D2) a compound represented by the following formula (IV):

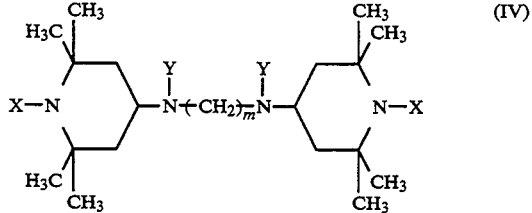

wherein X is hydrogen, oxygen, alkyl of 1 to 4 carbon atoms, hydroxy or alkoxy of 1 to 18 carbon atoms, m is an integer of 1 to 8, and Y is hydrogen, alkyl of 1 to 4 carbon atoms, alkanoly of 2 to 4 total carbon atoms or 2-acetoxyethyl;

(D3) a compound represented by the following formula (V):

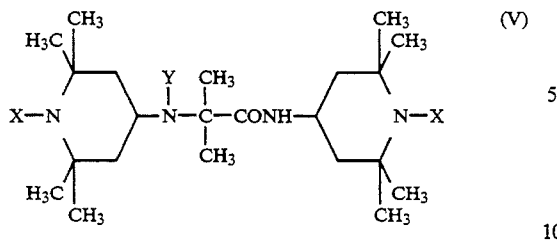

wherein X is hydrogen, oxygen, alkyl of 1 to 4 carbon atoms, hydroxy or alkoxy of 1 to 18 carbon atoms, and Y is hydrogen, alkyl of 1 to 4 carbon atoms, alkanoly of 2 to 4 total carbon atoms or 2-acetoxyethyl;

(D4) a compound represented by the following formula (VI):

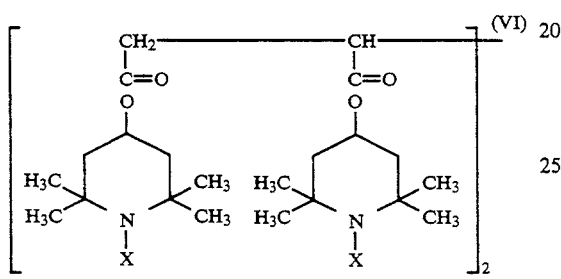

wherein X is hydrogen, oxygen, alkyl of 1 to 4 carbon atoms, hydroxy or alkoxy of 1 to 18 carbon atoms;

(D5) an oligomeric compound having a repeating unit represented by the following formula (VII):

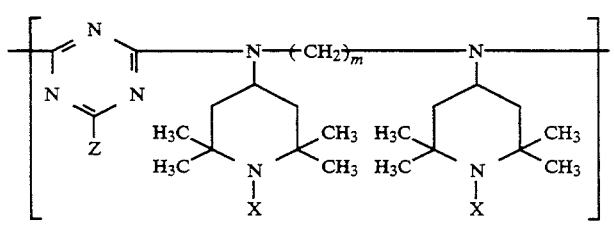

wherein X is hydrogen, oxygen, alkyl of 1 to 4 carbon atoms, hydroxy or alkoxy of 1 to 18 carbon atoms, Z is chlorine, $NR^3R^4$ or morpholino in which $R^3$ is hydrogen or alkyl of 1 to 4 carbon atoms and $R^4$ is alkyl of 1 to 18 carbon atoms;

(D6) a polycondensation product of a dicarboxylic compound represented by the following formula (VIII):

wherein $R^3$ is hydrogen or alkyl of 1 to 4 carbon atoms, and m is an integer of 1 to 8, with a dihydroxy compound represented by the following formula (IX):

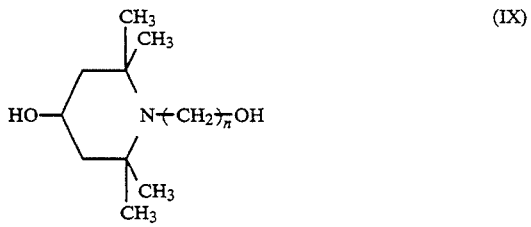

wherein n is an integer of 1 to 8; and (D7) a condensation product of an aliphatic polyamine with a chlorotriazine compound represented by the following formula (X):

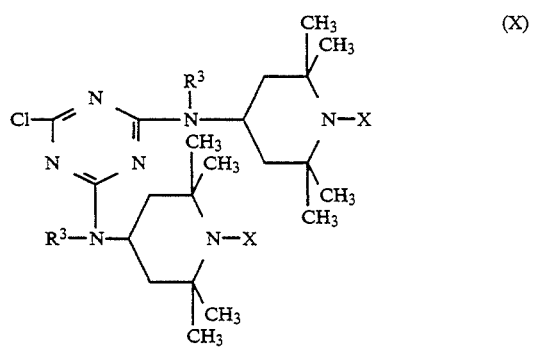

wherein X is hydrogen, oxygen, alkyl of 1 to 4 carbon atoms, hydroxy or alkoxy of 1 to 18 carbon atoms, and $R^3$ is hydrogen or alkyl of 1 to 4 carbon atoms.

9. The composition of claim 1, which comprises, per 100 parts by weight of the polyolefin resin of the component (A) containing the carbon black, 0.01 to 1 part by weight of the phenolic compound of the component (B), 0.02 to 2 parts by weight of the organic sulfur compound of the component (C), 0.01 to 1 part by weight of the piperidine compound of the component (D), and not higher than 5 parts by weight of the epoxy compound of the component (E).

10. The composition of claim 9, wherein the epoxy compound of the component (E) is present in an amount of at least 0.01 part by weight.

* * * * *

UNITED STATES PATENT AND TRADEMARK OFFICE
CERTIFICATE OF CORRECTION

PATENT NO. : 5,338,780
DATED : August 16, 1994
INVENTOR(S) : Fumitoshi KOJIMA; and Tetsuo YAMAGUCHI It is certified that error appears in the above-identified patent and that said Letters Patent is hereby corrected as shown below:

Column 1, lines 53-60, formula (I), change

" 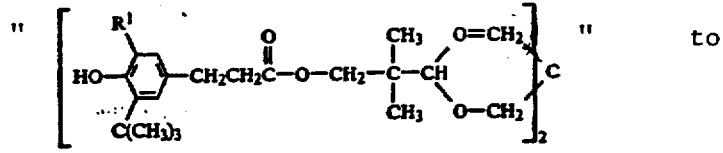 "   to

-- 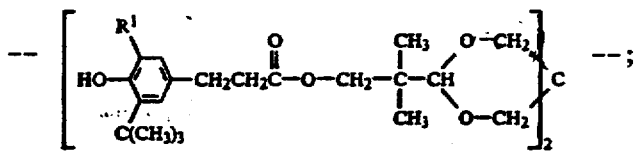 --;

Claim 1, column 11, lines 30-37, formula (I), change

" 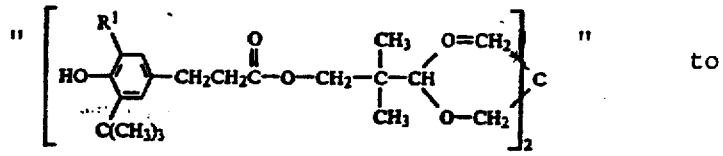 "   to

-- 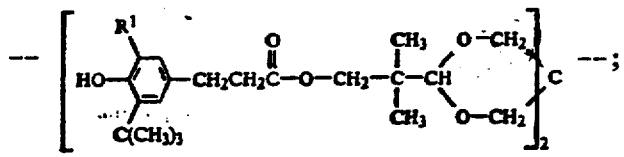 --;

In the Abstract, formula (I), change

" 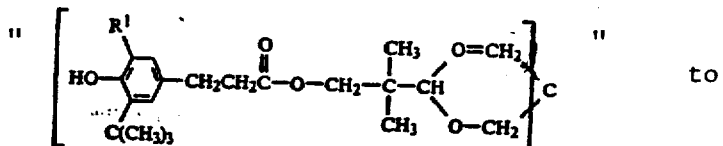 "   to

UNITED STATES PATENT AND TRADEMARK OFFICE
CERTIFICATE OF CORRECTION

PATENT NO. : 5,338,780

DATED : August 16, 1994

INVENTOR(S) : Fumitoshi KOJIMA; and Tetsuo YAMAGUCHI

It is certified that error appears in the above-identified patent and that said Letters Patent is hereby corrected as shown below:

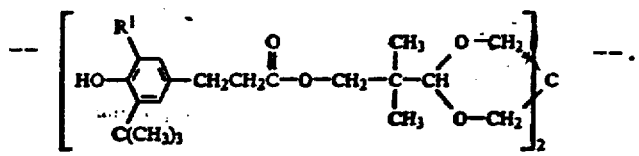

Signed and Sealed this

Twenty-eight Day of February, 1995

*Attest:*

BRUCE LEHMAN

*Attesting Officer*  Commissioner of Patents and Trademarks